(12) United States Patent
Sapack et al.

(10) Patent No.: US 10,704,939 B2
(45) Date of Patent: Jul. 7, 2020

(54) METHODOLOGY AND APPARATUS FOR DISTINGUISHING SINGLE PHASE FLUID FLOWS FROM MULTIPHASE FLUID FLOWS USING A FLOW METER

(71) Applicant: Expro Meters, Inc., Wallingford, CT (US)

(72) Inventors: Michael Sapack, Southbury, CT (US); Patrick Curry, Glastonbury, CT (US); David Bellemore, Glastonbury, CT (US); Charles Winston, Glastonbury, CT (US); Edward Beeloo, Ellington, CT (US)

(73) Assignee: Expro Meters, Inc., Wallingford, CT (US)

( * ) Notice: Subject to any disclaimer, the term of this patent is extended or adjusted under 35 U.S.C. 154(b) by 366 days.

(21) Appl. No.: 14/811,306

(22) Filed: Jul. 28, 2015

(65) Prior Publication Data
US 2017/0030748 A1 Feb. 2, 2017

(51) Int. Cl.
*G01F 1/66* (2006.01)
*G01F 1/74* (2006.01)

(52) U.S. Cl.
CPC . *G01F 1/66* (2013.01); *G01F 1/74* (2013.01)

(58) Field of Classification Search
CPC .................................... G01F 1/66; G01F 1/74
See application file for complete search history.

(56) References Cited

U.S. PATENT DOCUMENTS

| | | | |
|---|---|---|---|
| 6,609,069 B2 | 8/2003 | Gysling | |
| 7,152,003 B2* | 12/2006 | Loose | G01F 1/666 702/189 |
| 7,237,440 B2 | 7/2007 | Gysling et al. | |
| 7,389,187 B2 | 6/2008 | Kersey et al. | |
| 7,831,398 B2 | 11/2010 | Gysling et al. | |
| 7,962,293 B2 | 6/2011 | Gysling | |
| 2008/0236298 A1* | 10/2008 | Gysling | G01F 1/36 73/861.42 |
| 2009/0158858 A1* | 6/2009 | Gysling | G01F 1/662 73/861.27 |

* cited by examiner

*Primary Examiner* — Matthew G Marini
(74) *Attorney, Agent, or Firm* — Getz Balich LLC (57) ABSTRACT

An apparatus and method for sensing a fluid flow passing within a pipe, which fluid flow comprises at least a first fluid phase. The apparatus includes a flow meter having an array of sensors and at least one processing unit, which flow meter is adapted to sense the fluid flow passing within the pipe as it travels past the array of sensors and produce signals indicative of the presence of vortical structures convecting with the fluid flow. The at least one processing unit is adapted to: (a) produce a k-ω plot using the signals indicative of the presence of vortical structures convecting with the fluid flow, and determine a k-ω plot quality parameter that indicates the presence or absence of a second fluid phase within a fluid flow passing within a pipe; or (b) determine a shape factor parameter indicative of a presence or absence of a second fluid phase within a fluid flow passing within a pipe; or (c) both (a) and (b).

14 Claims, 9 Drawing Sheets

METHODOLOGY AND APPARATUS FOR DISTINGUISHING SINGLE PHASE FLUID FLOWS FROM MULTIPHASE FLUID FLOWS USING A FLOW METER

BACKGROUND

1. Technical Field

The present disclosure relates to methods and systems for sensing fluid flows passing within a conduit in general, and to those operable to distinguish single phase fluid flows from multiphase fluid flows in particular.

2. Background Information

Historically, a fundamental limitation of many prior art flow meters has been that they are limited to providing volumetric rate information for either a single phase gas flow or a single phase liquid flow, and they cannot provide volumetric flow information for particular phase within a multiphase flow. There are, however, some prior art flow meters that can provide volumetric flow information for particular phases within a multiphase flow. Those prior art flow meters require additional information to produce the volumetric flow information for particular phases within a multiphase flow. For example, some prior art flow meters use a compositional definition of the medium in the pipe to determine the ratio of gas to liquid, and hence the individual phase (gas/liquid) flow rates.

SUMMARY

According to an aspect of the disclosure, an apparatus for sensing a fluid flow passing within a pipe, which fluid flow comprises at least a first fluid phase, is provided. The apparatus includes a flow meter having an array of sensors and at least one processing unit. The flow meter is adapted to sense the fluid flow passing within the pipe as it travels past the array of sensors and produce signals indicative of the presence of vortical structures convecting with the fluid flow. The at least one processing unit is adapted to produce a k-ω plot using the signals indicative of the presence of vortical structures convecting with the fluid flow. The at least one processing unit is further adapted to determine a k-ω plot quality parameter that indicates the presence or absence of a second fluid phase within a fluid flow passing within a pipe.

In a further embodiment of the foregoing aspect, the quality parameter is a numeric value.

In a further embodiment of any of the foregoing embodiments or aspects of the present disclosure, the quality parameter is indicative of the signal to noise ratio of the signals processed to create the k-ω plot.

In a further embodiment of any of the foregoing embodiments or aspects of the present disclosure, the at least one processing unit is adapted to determine the k-ω plot quality parameter without a compositional definition of the fluid flow.

In a further embodiment of any of the foregoing embodiments or aspects of the present disclosure, the at least one processing unit is further adapted to determine a shape factor parameter indicative of a presence or absence of a second fluid phase within a fluid flow passing within a pipe.

In a further embodiment of any of the foregoing embodiments or aspects of the present disclosure, the shape factor parameter is based on a complex plane representation of the signals indicative of the presence of vortical structures convecting with the fluid flow, and is representative of at least one of phase modulation or amplitude modulation of the signals within the complex plane.

In a further embodiment of any of the foregoing embodiments or aspects of the present disclosure, the processing unit is adapted to produce the shape factor parameter as a numeric value, or a graphic representation, or both.

In a further embodiment of any of the foregoing embodiments or aspects of the present disclosure, the graphic representation is displayed within an Argand plot.

In a further embodiment of any of the foregoing embodiments or aspects of the present disclosure, the at least one processing unit is adapted to determine the shape factor parameter without a compositional definition of the fluid flow.

According to another aspect of the present disclosure, an apparatus for sensing a fluid flow passing within a pipe, which fluid flow comprises at least a first fluid phase, is provided. The apparatus includes a flow meter having an array of sensors and at least one processing unit. The flow meter is adapted to sense the fluid flow passing within the pipe as it travels past the array of sensors and produce signals indicative of the presence of vortical structures convecting with the fluid flow. The at least one processing unit is adapted to determine a shape factor parameter indicative of a presence or absence of a second fluid phase within a fluid flow passing within a pipe.

In a further embodiment of any of the foregoing embodiments or aspects of the present disclosure, the shape factor parameter is based on a complex plane representation of the signals indicative of the presence of vortical structures convecting with the fluid flow, and is representative of at least one of phase modulation or amplitude modulation of the signals within the complex plane.

In a further embodiment of any of the foregoing embodiments or aspects of the present disclosure, the processing unit is adapted to produce the shape factor parameter as a numeric value, or a graphic representation, or both.

In a further embodiment of any of the foregoing embodiments or aspects of the present disclosure, the graphic representation is displayed within an Argand plot.

In a further embodiment of any of the foregoing embodiments or aspects of the present disclosure, the at least one processing unit is adapted to determine the shape factor parameter without a compositional definition of the fluid flow.

In a further embodiment of any of the foregoing embodiments or aspects of the present disclosure, the at least one processing unit is adapted to produce a k-ω plot using the signals indicative of the presence of vortical structures convecting with the fluid flow, and the at least one processing unit is adapted to determine a k-ω plot quality parameter that indicates the presence or absence of a second fluid phase within a fluid flow passing within a pipe.

According to another aspect of the present disclosure, a method of sensing a fluid flow passing within a pipe, which fluid flow comprises at least a first fluid phase, is provided. The method includes; a) providing a flow meter having an array of sensors and at least one processing unit, which flow meter is adapted to sense the fluid flow passing within the pipe as it travels past the array of sensors and produce signals indicative of the presence of vortical structures convecting with the fluid flow; b) producing a k-ω plot using the at least one processing unit to process the signals indicative of the presence of vortical structures convecting with the fluid flow; and c) determining a k-ω plot quality parameter that indicates the presence or absence of a second fluid phase within a fluid flow passing within a pipe.

In a further embodiment of any of the foregoing embodiments or aspects of the present disclosure, the method further includes determining a shape factor parameter indicative of a presence or absence of a second fluid phase within a fluid flow passing within a pipe using the at least on processing unit.

According to another aspect of the present disclosure, a method of sensing a fluid flow passing within a pipe, which fluid flow comprises at least a first fluid phase, is provided. The method includes: a) providing a flow meter having an array of sensors and at least one processing unit, which flow meter is adapted to sense the fluid flow passing within the pipe as it travels past the array of sensors and produce signals indicative of the presence of vortical structures convecting with the fluid flow; and b) determining a shape factor parameter indicative of a presence or absence of a second fluid phase within a fluid flow passing within a pipe using the at least one processing unit.

In a further embodiment of any of the foregoing embodiments or aspects of the present disclosure, the shape factor parameter is based on a complex plane representation of the signals indicative of the presence of vortical structures convecting with the fluid flow, and is representative of at least one of phase modulation or amplitude modulation of the signals within the complex plane.

In a further embodiment of any of the foregoing embodiments or aspects of the present disclosure, the method further includes producing a k-ω plot using the signals indicative of the presence of vortical structures convecting with the fluid flow using the at least one processing unit, and determining a k-ω plot quality parameter that indicates the presence or absence of a second fluid phase within a fluid flow passing within a pipe.

According to an aspect of the disclosure, a processing unit adapted to determine a k-ω plot quality parameter that indicates the presence or absence of a second fluid phase within a fluid flow passing within a pipe is provided, which processor is adapted to cooperate with an apparatus for sensing a fluid flow passing within a pipe, which fluid flow comprises at least a first fluid phase. The apparatus includes a flow meter having an array of sensors and at least one processing unit. The flow meter is adapted to sense the fluid flow passing within the pipe as it travels past the array of sensors and produce signals indicative of the presence of vortical structures convecting with the fluid flow. The at least one processing unit is adapted to produce a k-ω plot using the signals indicative of the presence of vortical structures convecting with the fluid flow.

According to another aspect of the present disclosure, a processing unit is adapted to determine a shape factor parameter indicative of a presence or absence of a second fluid phase within a fluid flow passing within a pipe. The processing unit is adapted to cooperate with an apparatus for sensing a fluid flow passing within a pipe, which fluid flow comprises at least a first fluid phase. The apparatus includes a flow meter having an array of sensors and at least one processing unit. The flow meter is adapted to sense the fluid flow passing within the pipe as it travels past the array of sensors and produce signals indicative of the presence of vortical structures convecting with the fluid flow.

The foregoing aspects, features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION OF THE INVENTION

The present disclosure as described herein includes apparatus and methods for sensing a fluid flow passing within a pipe, which fluid flow includes at least a first phase of fluid, and determining the presence or absence of a second fluid phase within the fluid flow. As will be described, the present disclosure utilizes a flow meter having an array of sensors. The flow meter is adapted to sense the fluid flow passing within the pipe as it travels past the array of sensors and produce signals indicative of the presence of vortical structures convecting with the fluid flow. The flow meter is adapted to determine one or more parameters indicative of the presence or absence of a second fluid phase within a fluid flow passing within a pipe, which determination is based on the signals produced by the array of sensors, which signals are indicative of the presence of vortical structures convecting with the fluid flow. The present disclosure is not limited to any particular type of flow meter that utilizes an array of sensors. For purposes of providing an enabling disclosure, non-limiting examples of acceptable flow meters that may be adapted according to the present disclosure are provided hereinafter.

The present disclosure is described hereinafter in terms of sensing a fluid flow passing within a "pipe". The term "pipe" is generally understood to refer to a cylindrical vessel having an interior volume defined by a wall (i.e., the pipe wall), and an axial centerline along which the fluid flow travels. The present disclosure is not limited to sensing a fluid flow in a cylindrical vessel and has utility with a variety of conduits (e.g., different shapes, etc.). For purposes of simplifying the description herein, however, the present disclosure is described in terms of sensing fluid flow within a "pipe"

Figure 1:
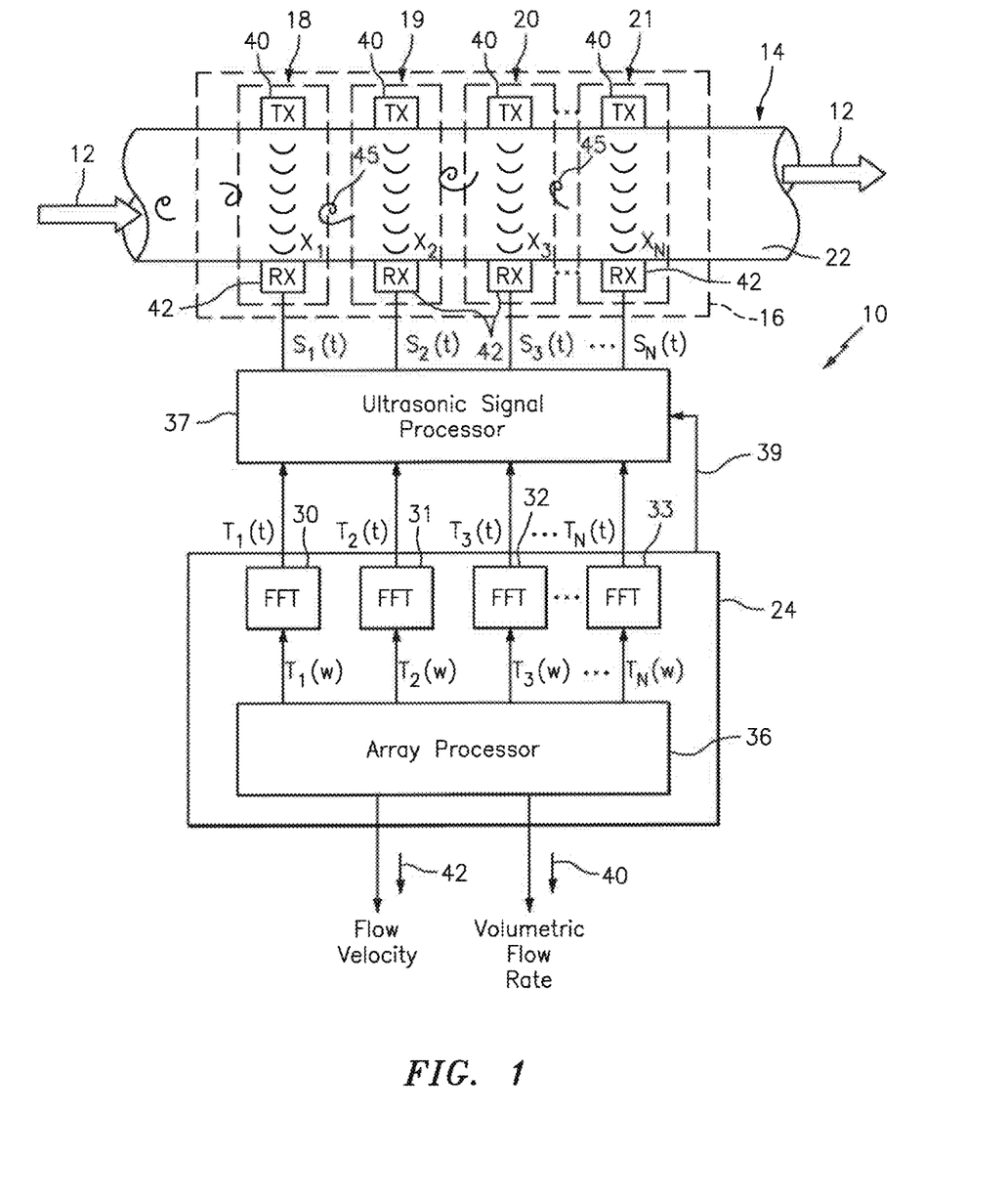
FIG. 1 is a diagrammatic example of a flow meter having an array of ultrasonic sensor units disposed axially along a pipe for measuring the volumetric flow of the fluid flowing in the pipe.

Referring to FIG. 1, a flow meter, generally shown as 10, is provided to measure the velocity and/or volumetric flow rate of a single phase fluid flow 12 (e.g., gas, liquid or liquid/liquid mixture) and/or a multi-phase fluid flow 12 flowing through a pipe. The multi-phase fluid flow may be a two-phase liquid/gas mixture, a solid/gas mixture or a solid/liquid mixture, gas entrained liquid or a three-phase mixture. To simplify the description hereinafter, single or multi-phase fluid flows will be referred to hereinafter collectively as a "fluid flow 12".

The flow meter 10 includes a sensing device 16 comprising an array of ultrasonic sensor units 18-21. Each sensor unit comprises a pair of ultrasonic sensors 40, 42, one of which functions as a transmitter (Tx) 40 and the other as a receiver (Rx) 42. The sensor units 18-21 are spaced axially along the outer surface 22 of a pipe 14 having a fluid flow 12 propagating therein. The ultrasonic sensor units 18-21 may be described as being located at defined positions $X_1$, $X_2, X_3 \ldots X_N$ axially along the pipe 14. Each pair of sensors 40, 42 may be diametrically disposed on the pipe at the aforesaid predetermined locations along the pipe to provide a through transmission configuration, such that the sensors transmit and receive ultrasonic signals that propagate through the fluid flow substantially orthogonal to the direction of the fluid flow 12 within the pipe. The ultrasonic sensors 18-21 may be "wetted" or clamped onto the outer surface 22 of the pipe 14 (e.g. contact or non-contact sensor).

Each pair of ultrasonic sensors 40, 42 measures a transit time (i.e., time of flight—"TOF"—or phase modulation) of an ultrasonic signal propagating through the fluid flow 12 from the transmitting sensor 40 to the receiving sensor 42. The transit time measurement or variation is indicative of a coherent properties that convect with the flow within the pipe (e.g., vortical disturbances, inhomogenieties within the flow, temperature variations, bubbles, particles, pressure disturbances), which are indicative of the velocity of the fluid flow 12. To facilitate the description herein, the aforesaid coherent properties will be referred to hereinafter as "vortical structures", but the present disclosure is not limited to sensing any particular type of coherent property. The ultrasonic sensors may operate at any frequency, however, it has be found that the higher frequency sensors are more suitable for single phase fluids while lower frequency sensors are more suitable for multiphase fluids. Non-limiting examples of frequencies that may be used for a flow meter as described herein are 1 MHz and 5 MHz. The ultrasonic sensors may provide signals through the fluid flow 12 in various different forms; e.g., a pulsed, chirped or continuous signal. An example of the sensor units 18-21 that may be used are Model no. 113-241-591, manufactured by Krautkramer Ultrasonic Systems.

An ultrasonic signal processor 37 fires the sensors 40 in response to a firing signal 39 from a processor 24 and receives the ultrasonic output signals $S_1(t)$-$S_N(t)$ from the sensors 42. The signal processor 37 processes the data from each of the sensor units 18-21 to provide an analog or digital output signal $T_1(t)$-$T_N(t)$ indicative of the time of flight or transit time of the ultrasonic signal through the fluid. The signal processor 37 may also provide an output signal indicative of the amplitude (or attenuation) of the ultrasonic signals. An example of an acceptable signal processor 37 is a model no. USPC 2100 manufactured by Krautkramer Ultrasonic Systems.

The output signals $T_1(t)$-$T_N(t)$ of the ultrasonic signal processor 37 are provided to the processor 24, which processes the transit time measurement data to determine the volumetric flow rate. The transit time or time of flight measurement is defined by the time it takes for an ultrasonic signal to propagate from the transmitting sensor 40 to the respective receiving sensor 42 through the pipe wall and the fluid flow 12. The effect of the vortical structures 45 on the transit time of the ultrasonic signal is to delay or speed up the transit time. Therefore, each sensing unit 18-21 provides a respective output signal $T_1(t)$-$T_N(t)$ indicative of the variations in the transit time of the ultrasonic signals propagating orthogonal to the direction of the fluid flow 12. The measurement is derived by interpreting the convecting coherent property and/or characteristic within the process piping using at least two sensor units 18, 19. The above described flow meter is a non-limiting example of a flow meter that may be adapted according to the present disclosure. U.S. Pat. No. 7,389,187, which is hereby incorporated by reference in its entirety, discloses an example of such a flow meter.

The term "processor" as used herein may refer to a single processing device or a plurality of processing devices. Such a processing device may be a microprocessor, co-processors, a micro-controller, a digital signal processor, a microcomputer, a central processing unit, a field programmable gate array, a programmable logic device, logic circuitry, analog circuitry, digital circuitry, and/or any device that manipulates signals (analog and/or digital) based on operational instructions that are stored in a memory device. The memory device may include one or more software modules to be executed by the processor, e.g., program files, system data, buffers, drivers, utilities and other system programs. The memory device may also include storage for incoming data. The memory device may be a single memory device or a plurality of memory devices; e.g., one or more of a network attached storage, a disk drive, a read-only memory, a random access memory, a volatile memory, a non-volatile memory, a static memory, a dynamic memory, a flash memory, a cache memory, and/or any device that stores digital information.

Vortical structures 45 are an inherent feature of turbulent boundary layers present in all turbulent flows. Unlike conventional vortex shedding meters, no internal geometry is required to generate these structures. The overwhelming majority of industrial process fluid flows 12 involve turbulent flow. Turbulent fluctuations within the flow 12 govern many of the flow properties of practical interest including the pressure drop, heat transfer, and mixing. For engineering applications, considering only the time-averaged properties of turbulent flows is often sufficient for design purposes. For sonar based array processing flow metering technology, understanding the time-averaged velocity profile in turbulent fluid flow 12 provides a means to interpret the relationship between speed at which vortical structures 45 convect and the volumetrically averaged flow rate.

Figure 2:
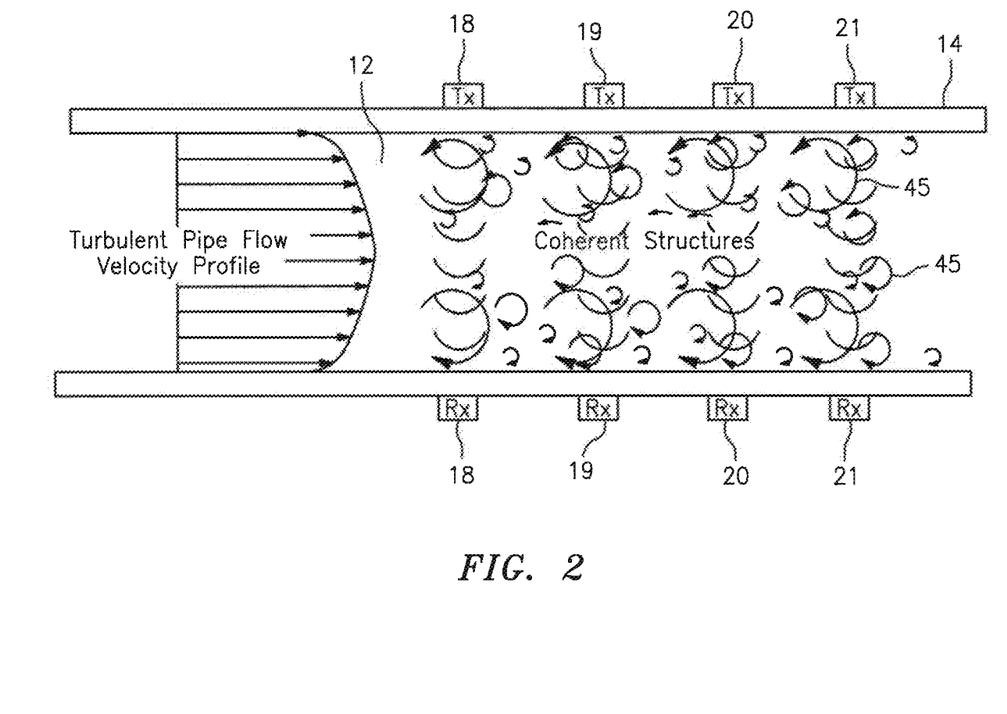
FIG. 2 is a cross-sectional view of a pipe with sensor units, which pipe contains a turbulent fluid flow with coherent structures disposed within the pipe.

FIG. 2 illustrates the relevant flow features of turbulent pipe fluid flow 12 along with an axial array of ultrasonic sensor units 18-21, each sensor unit having a transmitter unit 40 and a receiver unit 42. As shown, the time-averaged axial velocity is a function of radial position, from zero at the wall to a maximum at the centerline of the pipe. The fluid flow 12 near the wall is characterized by steep velocity gradients and transitions to relatively uniform core fluid flow near the center of the pipe 14. Vortical structures 45 are superimposed over the time averaged velocity profile. The vortical structures 45 contain temporally and spatially random fluctuations with magnitudes typically less than 10% percent of the mean flow velocity and are carried along with the mean flow. Experimental investigations have established that vortical structures 45 generated within turbulent boundary layers remain coherent for several pipe diameters and convect at roughly 80% of maximum flow velocity.

From a volumetric flow measurement perspective, the volumetrically averaged flow velocity is of interest. The volumetrically averaged flow velocity, defined as the total volumetric flow rate, Q, divided by the cross sectional area of the conduit, A, is a useful, but arbitrarily defined property of the flow. In fact, given the velocity profile within the pipe, little flow is actually moving at this speed. The precise relationship between the convection speed of vortical structures 45 and the flow rate is determined experimentally through calibration for each.

The processor 24 that receives the transit time-varying signals $T_1(t)-T_N(t)$ may be adapted with various different algorithms (e.g., programmed with instructions recorded in a non-transient memory) to determine the convection velocity of the vortical structures 45 within the process flow. For example, an array processing algorithm can be used that characterizes temporal and spatial frequency characteristics of the flow field. For a series of vortical structures 45 convecting past a fixed array of ultrasonic sensors units 18-21, the temporal and spatial frequency content of pressure fluctuations are related through the following relationship:

$$k = \frac{\omega}{U_{convect}}$$

where k is the wave number or spatial frequency, defined as $k=2\pi/\lambda$ and has units of 1/length, $\omega$ is the temporal frequency in rad/sec, and $U_{convect}$ is the convection velocity. Thus, the temporal frequency, $\omega$, is linearly related to the spatial frequency, k, by the convection velocity.

In array processing, the spatial/temporal frequency content of time stationary sound fields may be displayed using a "k-ω plot". A k-ω plot 64 is essentially a three-dimensional power spectra in which the power of the field is decomposed into bins corresponding to specific spatial wave numbers and temporal frequencies. On a k-ω plot 64, the power associated with a pressure field convecting with the flow is distributed in regions, which satisfies the dispersion relationship developed above. This region is typically referred to as a "convective ridge" 61 and the slope of the ridge 61 on a k-ω plot 64 is indicative of the convective velocity of a pressure field determined by measuring the variation in the TOF by each ultrasonic sensor unit 18-21. In short, the convective velocity of vortical structures 45, and hence fluid flow rate within a pipe 14, can be determined by constructing a k-ω plot 64 from the output of an array of sensors and identifying the slope of the convective ridge 61, as will described in greater detail hereinafter.

Figure 3:
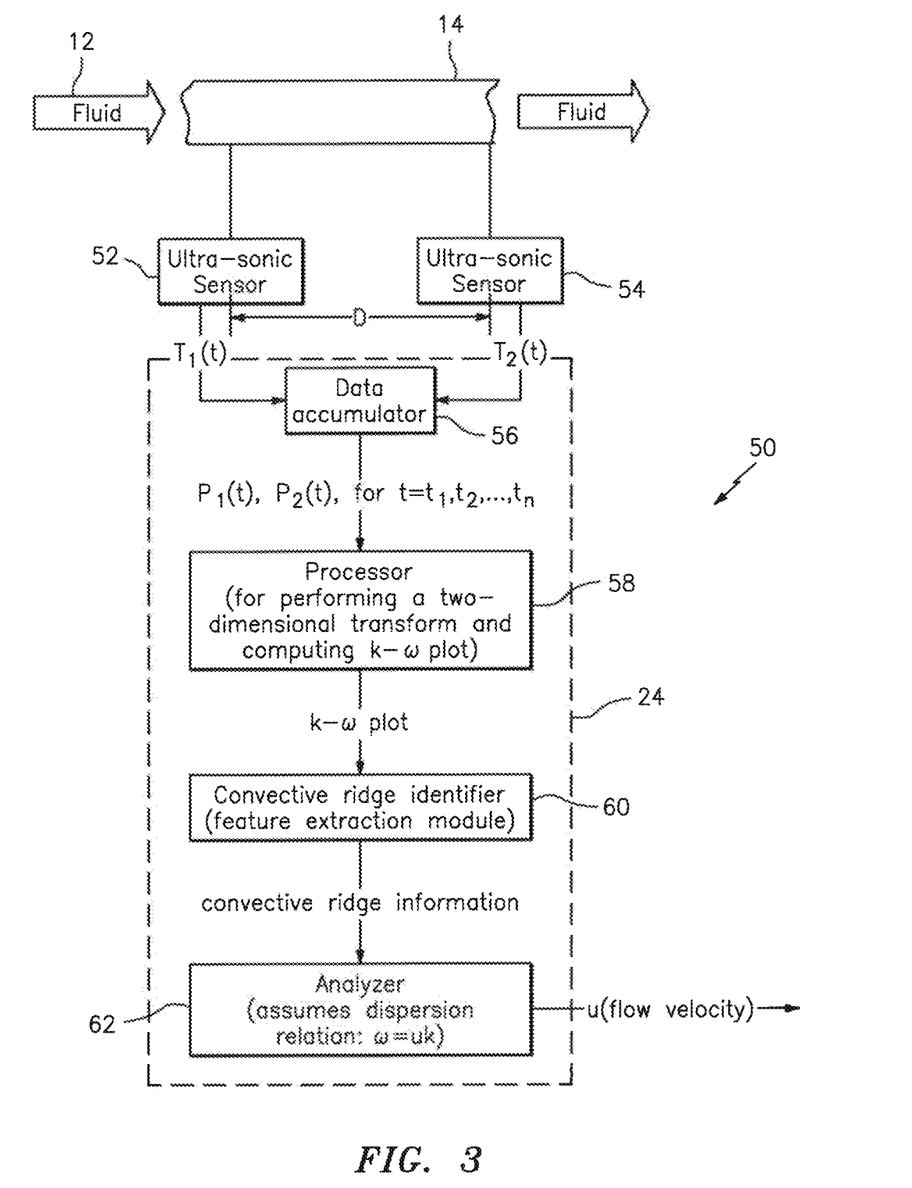
FIG. 3 is a diagrammatic view of the flow meter shown in FIG. 1, indicating components within a processor.

An example of a flow meter processor 24 is diagrammatically shown in FIG. 3. The processor 24 may include a data accumulator 56, a processor 58, a convective ridge identifier 60, and an analyzer 62. The data accumulator 56 accumulates the signals $T_1(t)-T_N(t)$ from the ultrasonic sensor units 18-21, and provides the data accumulated over a sampling interval to a processor 58, which performs a spatial-temporal (two-dimensional) transform of the sensor data, from an x-t domain to a k-ω domain, and then calculates the power in the k-ω plane, as represented by k-ω plot 64.

Figure 4:
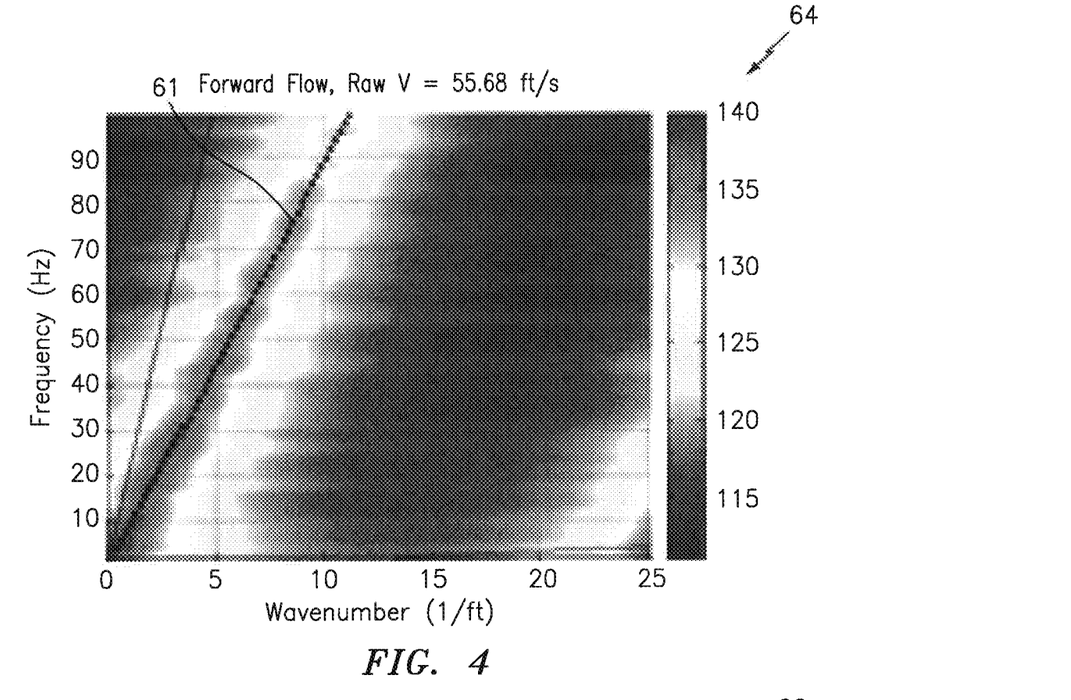
FIG. 4 is a k-ω plot showing a convective ridge associated with a dry gas fluid flow.

To calculate the power in the k-ω plane, as represented by a k-ω plot 64 (e.g., see FIG. 4) of either the ultrasonic signals or the differenced ultrasonic signals, the processor 58 determines the wavelength and so the (spatial) wavenumber k, and also the (temporal) frequency and so the angular frequency ω, of various spectral components of the ultrasonic waves created by the vortical structures 45. As indicated above, there are numerous algorithms available in the public domain to perform the spatial/temporal decomposition of signals produced by the array of sensor units.

For those fluid flows 12 that include suitable vortical structures 45, the k-ω plot 64 (e.g., see FIG. 4) will include a convective ridge 61 that represents the concentration of the disturbances that convect with the flow 12 and is a mathematical manifestation of the relationship between the spatial variations and temporal variations described above. Such a plot 64 will indicate a tendency for k-ω pairs to appear more or less along a line (i.e., the convective ridge 61) with a slope, which slope is indicative of the flow velocity. The power in the k-ω plane so determined is then provided to a convective ridge identifier 60, which uses one or another feature extraction method to determine the location and orientation (slope) of any convective ridge 61 present in the k-ω plane. Finally, information including the convective ridge orientation (slope) is used by an analyzer 62 to determine the flow velocity.

The processor 58 may use standard so-called beam forming, array processing, or adaptive array-processing algorithms; i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$, where $\lambda$ is the wavelength of a spectral component, and corresponding angular frequencies given by $\omega=2\pi\upsilon$.

Once the power in the k-ω plane is determined, the convective ridge identifier 60 uses one or another feature extraction methodology to discern a convective ridge 61 and its orientation in the k-ω plane. For example, the ridge identifier 60 may use a slant stacking method, in which the accumulated frequency of k-ω pairs in the k-ω plot 64 along different rays emanating from the origin are compared, each different ray being associated with a different trial convection velocity (in that the slope of a ray is assumed to be the flow velocity or correlated to the flow velocity in a known way). The convective ridge identifier 60 subsequently provides the convective ridge information to the analyzer 62. The analyzer 62 examines the convective ridge information and, assuming the straight-line dispersion relation given by equation (1), determines the flow velocity and its uncertainty.

The exemplary flow meter described above uses an array of ultrasonic sensor units 18-21 to create information regarding spatial and temporal variations associated with vortical structures 45 convecting with the fluid flow 12, and thereby produce the desired volumetric flow rate. Flow meters that utilize ultrasonic sensors transmitting ultrasonic signals through the fluid flow 12 may be referred to as "active" flow meters since they introduce signals into the fluid flow 12. The present disclosure is not limited to use with active flow meters. U.S. Pat. No. 7,110,893 "Method and Apparatus for Measuring a Parameter of a Fluid Flowing Within a Pipe Using an Array of Sensors", which is hereby incorporated by reference in its entirety, discloses a flow meter that utilizes an array of pressure transducers that sense the passage of vortical structures 45, and uses the sensed pressure variations to create a k-ω plot. Flow meters that utilize pressure transducers do not themselves transmit signals through the fluid flow, but rather sense pressure variations within the flow. Flow meters of this type are sometimes referred to as "passive" flow meters. The present disclosure could be implemented using a flow meter having an array of passive sensors like that disclosed in U.S. Pat. No. 7,110,893, or other flow meters that produce flow velocity information based on spatial and temporal variations associated with vortical structures 45 convecting with the fluid flow 12.

As indicated above, a fundamental limitation of prior art flow meters has been that they are limited to providing volumetric rate information for either a single phase gas flow or a single phase liquid flow, and they cannot provide accurate volumetric flow information for a particular phase within a multiphase flow. According to aspects of the present disclosure, information relating to the ratio of gas and liquid within the fluid flow 12 and the individual phase rates within the fluid flow 12 can be provided using information generated by the flow meter itself (e.g., transit time or time of flight measurement), without additional information such as a compositional definition of the fluid flow 12 passing within the pipe.

In a first aspect of the present disclosure, one or more processors within the flow meter (or in communication with the flow meter) are adapted to determine a parameter value referred to hereinafter as the "quality metric" of a k-ω plot. The quality metric value is indicative of the signal to noise ratio of the signals processed to create the k-ω plot. The quality metric value may be determined, for example, by comparing flow meter sensor signals processed within the flow meter and represented in a first region of the k-ω plot to similarly processed signal information relative to a second region of the k-ω plot. As indicated above, a k-ω plot represents processed sensor signal data as a function of frequency and wavenumber (e.g., a mathematical/graphical manifestation of the relationship between the spatial variations and temporal variations of disturbances within the flow), and a convective ridge 61 disposed within a k-ω plot is indicative of a concentration of the disturbances that convect with the flow 12. The k-ω plots shown in FIGS. 4, 5, 6, 7, and 8 each illustrate a single convective ridge 61. A convective ridge 61 (when present) is, however, a characteristic of a k-ω plot that repeats ever 2π. Since each convective ridge 61 is indicative of a concentration of the disturbances that convect with the flow 12, the regions of the k-ω plot outside of the ridge 61 (e.g., between ridges) are indicative of lower concentrations of the disturbances that convect with the flow 12, and may be used to create a reference indicative of signal information less attributable to the disturbances convecting with the flow. Comparing the processed sensor signal data associated with the ridge 61 to the processed sensor signal data associated outside of the ridge permits a signal to noise determination; e.g., a determination of the amount of signal attributable to vortical disturbances convecting with the flow relative to background signal "noise". Such a determination can be performed in a variety of different ways and the present disclosure is not limited to any particular methodology. For example, the slope of a convective ridge 61 may be compared to the slope of a data line created in a region of the k-ω plot outside of the ridge, and a numerical representation of the comparison (e.g., a quality metric value) can be produced.

It can be seen from above therefore, that a quality metric value of a k-ω plot 64 can be determined using information (e.g., transit time or time of flight measurement) generated by the flow meter 10 itself, without additional information such as a compositional definition of the fluid flow 12 passing within the pipe 14. The term "compositional definition" as used herein refers to information relating to constituents within the fluid flow that collectively form the fluid flow; e.g., a schedule of the relative contributions (volumetric or otherwise) of the constituents within the fluid flow, such as different type of specific hydrocarbon materials within a hydrocarbon flow, etc. The range of quality metric values (which values are arbitrarily assigned based on the chosen comparison, and may be normalized) correlates with a range of gas/liquid ratio values for the fluid flow 12. The specific quality metric value of a fluid flow 12 can be used to qualitatively or quantitatively indicate a particular gas/liquid ratio value for the fluid flow 12. In the examples described below, the range of quality metric numeric values is arbitrarily defined between one and zero (1.0-0.0). These quality metric values represent normalized values. The present disclosure is not limited to any particular quality metric numeric value range, normalized or otherwise.

Figure 6:
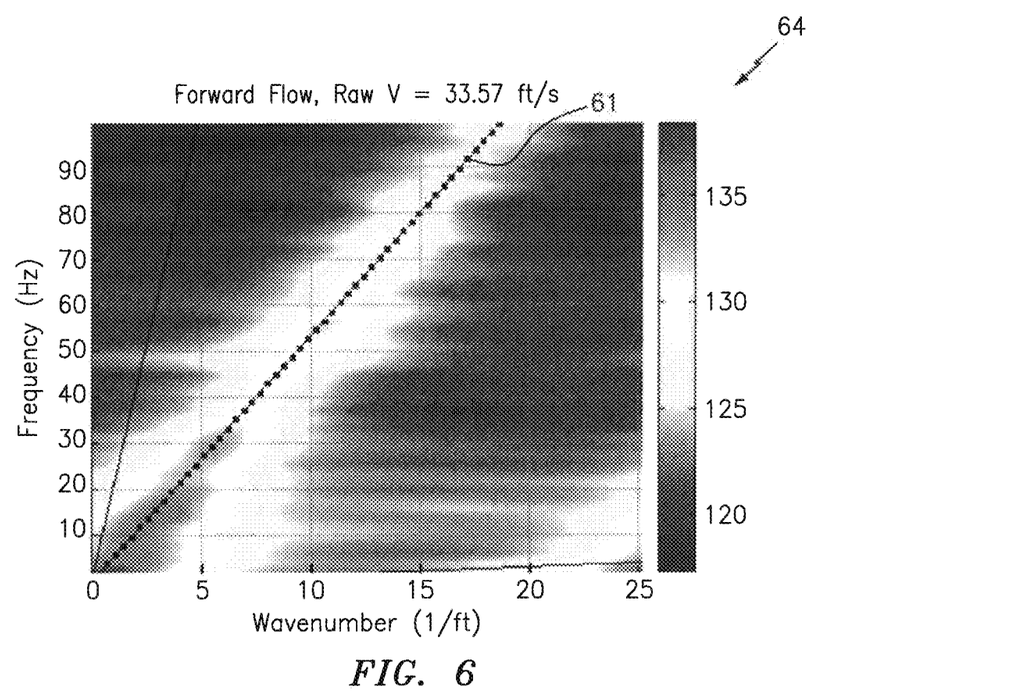
FIG. 6 is a k-ω plot showing a convective ridge associated with a somewhat wet gas fluid flow.
Figure 7:
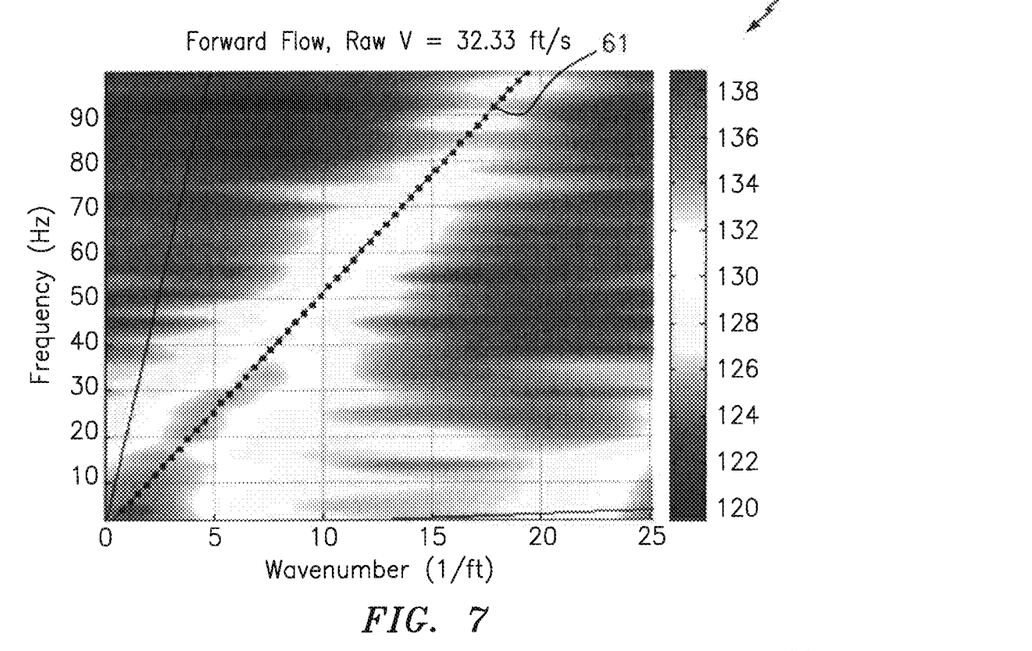
FIG. 7 is a k-ω plot showing a convective ridge associated with a wet gas fluid flow.

In general, the quality metric value of a k-ω plot 64 varies as a function of phase constituency of the fluid flow being sensed. For example, a single phase fluid flow 12 (e.g., a fluid flow consisting substantially or entirely of gas, or substantially or entirely of liquid) will have a k-ω plot 64 with a relatively well defined convective ridge 61 region. A multi-phase fluid flow 12 (e.g., a mixture of gas and liquid), in contrast, will have a k-ω plot 64 with a convective ridge region that is less well defined. Accordingly, the quality metric value can be correlated to the gas/liquid ratio of the fluid flow 12 within the pipe, with a change in quality metric corresponding to a change in the gas/liquid ratio of the fluid flow 12. For example, a dry gas fluid flow 12 may be described as having a quality metric value that is at or nearly 1.0. The fluid flow 12 represented in the k-ω plot 64 shown in FIG. 4, for example, is a dry gas fluid flow having a quality metric value of 0.985. Using the same quality metric value range (1.0-0.0), a fluid flow 12 that includes more than one fluid phase (e.g., gas and liquid) will have a quality metric value that is less than 1.0, with the quality metric value being qualitatively related to the "wetness" (i.e., the specific gas/liquid ratio) of the fluid flow 12. The fluid flow 12 represented in the k-ω plot 64 shown in FIG. 5, for example, is a multiphase fluid flow 12 having a relatively small percentage of liquid relative to the gas percentage of the fluid flow (i.e., a "slightly wet gas" fluid flow). The fluid flow 12 represented in the k-ω plot 64 shown in FIG. 5 has a quality metric value of 0.892. The fluid flow 12 represented in the k-ω plot 64 shown in FIG. 6 is also a multiphase fluid flow 12, but has a greater (relative to the fluid flow 12 represented in FIG. 5) gas/liquid ratio (i.e., a "somewhat wet gas" fluid flow). The fluid flow 12 represented in the k-ω plot 64 shown in FIG. 6 has a quality metric value of 0.806. The fluid flow 12 represented in the k-ω plot 64 shown in FIG. 7 is another multiphase fluid flow 12, but has a greater (relative to the fluid flow 12 represented in FIG. 6) gas/liquid ratio (i.e., a "wet gas" fluid flow). The fluid flow 12 represented in the k-ω plot 64 shown in FIG.

Figure 8:
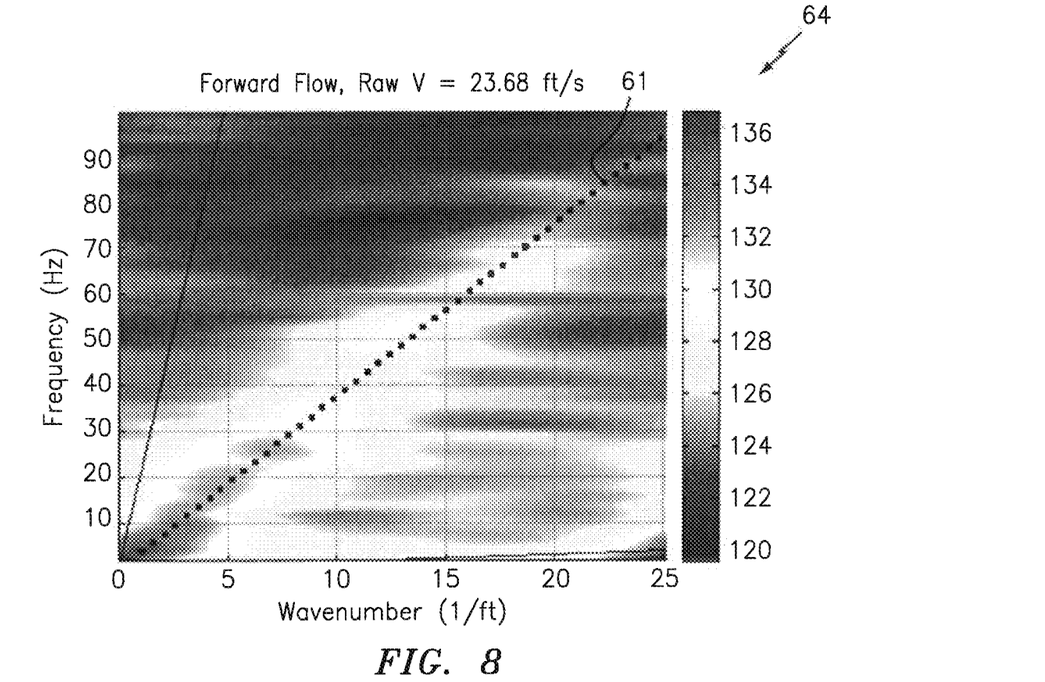
FIG. 8 is a k-ω plot showing a convective ridge associated with a very wet gas fluid flow.

7 has a quality metric value of 0.681. The fluid flow 12 represented in the k-ω plot 64 shown in FIG. 8 is still another multiphase fluid flow 12, but has a still greater (relative to the fluid flow 12 represented in FIG. 7) gas/liquid ratio (i.e., a "very wet gas" fluid flow). The fluid flow 12 represented in the k-ω plot 64 shown in FIG. 8 has a quality metric value of 0.476. From these k-ω plots 64 and the associated quality metric values, a qualitative relationship between the quality metric values and the wetness of the fluid flow 12 can be seen. Hence, the quality metric value can be used as an indicator of the presence (or absence) of and relative ratio of a secondary phase in a flow stream 12.

In addition to the quality metric value providing qualitative information, in some instances the quality metric value can also be used to provide quantitative information. For example, quantitative information may be determined by correlating the quality metric value to the gas/liquid ratio in a flow stream 12; e.g., by determining quality metric values for a statistically sufficient population of fluid flows, and determining specific gas/liquid ratio values (i.e., wetness values) for each of the fluid flows 12. An empirical value database, graphical solution, and/or mathematical expression representative of the relationship between the quality metric values and the gas/liquid ratio values could be subsequently used to provide quantitative information for fluid flows 12 other than those used to create the statistically sufficient empirical database, graphical solution, and/or mathematical expression.

Figure 4A:
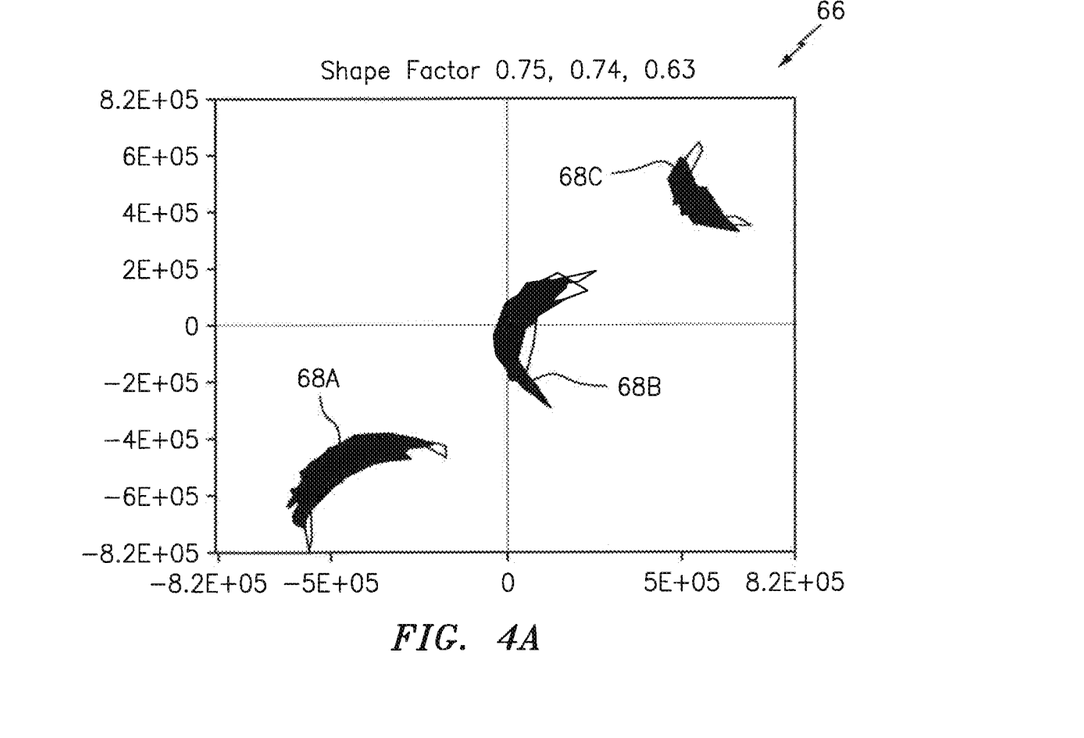
FIG. 4A is an Argand plot associated with a dry gas fluid flow, showing graphic representations of shape factors.

According to another aspect of the present disclosure, one or more processors within the flow meter 10 (or in communication with the flow meter) are adapted to determine a graphic and/or numeric parameter value (referred to hereinafter as the "shape factor") that is characteristic of the fluid flow 12 (e.g., characteristic of the "wetness" or gas/liquid ratio of the fluid flow, individual flow phase rates, etc.). Like the quality metric, the shape factor is determined using information generated by the flow meter 10 itself (e.g., transit time or time of flight measurement), without additional information such as a compositional definition of the fluid flow 12 passing within the pipe. As will be explained below, a shape factor value may be determined using the type and magnitude of modulation of the pulsed-array sensor signals produced by the flow meter 10. When displayed within an Argand plot 66 (e.g., See FIG. 4A), the sensor signal modulation of a single phase fluid flow 12 (e.g., dry gas or liquid) may be characterized by a first graphic representation (e.g., a thin arc-shaped graphic representation 68A-68C as shown in FIG. 4A). As a secondary phase is added to the fluid flow 12, the shape of the graphic representation 68A-68C of the signal modulation changes to a second graphic representation (e.g., transitioning from the thin arc-shaped graphic representation to a nearly circular-shaped graphic representation as a function of the wetness of the fluid flow). Hence, the graphic representation of the signal modulation can by itself be used to information that is qualitatively related to the "wetness" or gas/liquid ratio of the fluid flow 12, individual flow phase rates, etc.

Like the quality metric, a shape factor can also be expressed in a numeric form; e.g., a numeric value residing within a range of numeric values. The range of shape factor values correlates with a range of gas/liquid ratio values for the fluid flow 12. The specific shape factor value of a fluid flow 12 can be used to qualitatively or quantitatively indicate a particular gas/liquid ratio value for the fluid flow 12.

To determine a shape factor, the present disclosure may consider the received signal(s) (e.g., from ultrasonic sensor units 18-21) as a sinusoidal wave in terms of a fluid borne portion and a structural borne portion. The received signal may be further processed by projecting the received signal against a sine function and a cosine function of a predetermined frequency (f) over a period of time (t) after the signal has arrived at the receiver:

$$S1 = \int_{t=t_0}^{t_0+\frac{N}{f}} v_1(t)\sin(\omega t) dt \quad \text{[Eqn. 1]}$$

$$C1 = \int_{t=t_0}^{t_0+\frac{N}{f}} v_1(t)\cos(\omega t) dt \quad \text{[Eqn. 2]}$$

where "N" is an integer value and "ω" is a temporal frequency. The predetermined frequency "f" is typically selected to be substantially identical to the dominate frequency of the received signal.

Figure 9:
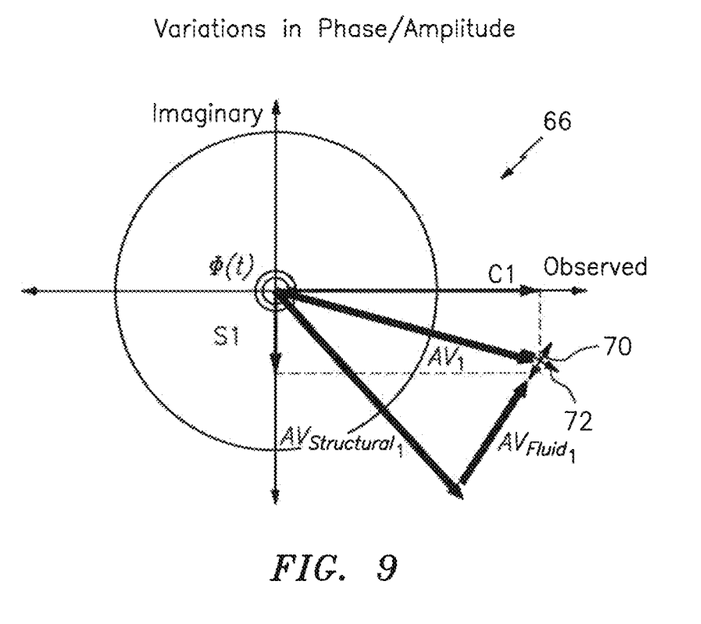
FIG. 9 is a diagrammatic illustration of an Argand plot showing an arrival vector and a structural component modulation vector and a fluid component modulation vector for a single signal channel.

Modulations within the received signal can be transformed into a complex plane representation (e.g., as shown in FIG. 9), where the amplitude and phase of the received signal are given by the amplitude and phase of an "arrival vector", which is defined as:

$$AV_1 = C1 + iS1 = A_1(t)e^{i\phi(t)} \quad \text{[Eqn. 3]}$$

where $AV_1$ is the arrival vector, $A_1(t)$ is the amplitude of the arrival vector, and ø(t) is the phase of the arrival vector in the complex plane.

The amplitude and phase of the arrival vector in the complex plane can be expressed as follows:

$$A_1(t) = \sqrt{C1^2 + S1^2} \quad \text{[Eqn. 4]}$$

$$\phi(t) = \tan^{-1}\left(\frac{S1}{C1}\right) \quad \text{[Eqn. 5]}$$

In the complex plane, variations in the time required for an ultrasonic signal wave to propagate across the pipe containing the fluid flow 12 will manifest themselves as variations in the phase of the arrival vector and variations in amplitude of the ultrasonic signal wave propagating across the pie containing the fluid flow 12 will manifest themselves as variation in the amplitude of the arrival vector.

As indicated above, the exemplary flow meter described above uses an array of ultrasonic sensor units 18-21 to create information regarding spatial and temporal variations associated with vortical structures 45 convecting with the fluid flow 12, and thereby produce the desired volumetric flow rate. The present disclosure could be implemented using a flow meter having an array of passive sensors like that disclosed in U.S. Pat. No. 7,110,893, or other flow meters that produce flow velocity information based on spatial and temporal variations associated with vortical structures 45 convecting with the fluid flow 12.

Figure 10:
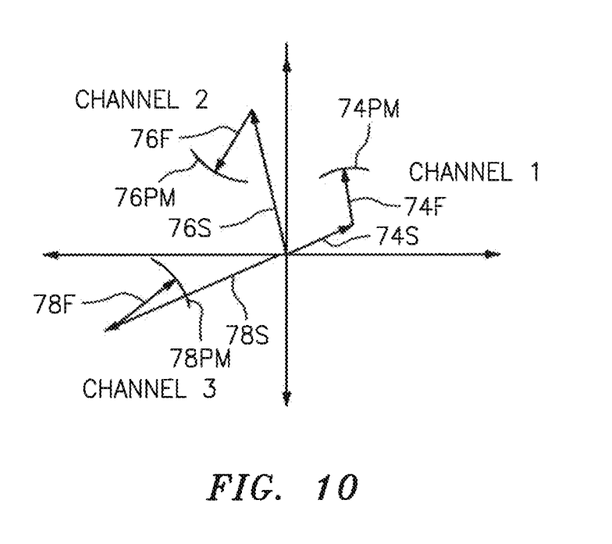
FIG. 10 is a diagrammatic illustration of an Argand plot showing structural component modulation vectors and fluid component modulation vectors for three signal channels.

Referring to FIG. 9, a diagrammatic representation of an Argand plot 66 is shown with arrival vector components for a single signal channel. The arrival vector $AV_1$ represents the contributions of the structural component modulation vector ($AV_{Structural1}$) and the fluid component modulation vector ($AV_{Fluid1}$). The phase modulation of the arrival vector $AV_1$ is shown as a tangent vector 70, and the amplitude modulation of the arrival vector $AV_1$ is shown as a vector 72 normal to the phase modulation vector 70. FIG. 10 is a diagrammatic representation of an Argand plot that illustrates arrival vector components for three separate signal channels (structural component modulation vector 74S for channel 1, fluid component modulation vector 74F for channel 1, structural component modulation vector 76S for channel 2, fluid component modulation vector 76F for channel 2, structural component modulation vector 78S for channel 3, fluid component modulation vector 78F for channel 3). In FIG. 10, the phase modulation vector 74PM, 76PM, 78PM of each fluid component vector is shown.

The shape factor parameter is indicative of the signal to noise ratio of the signals created by the flow meter sensors sensing the flow (e.g., the sensor signals subsequently processed to create the k-ω plot). In terms of the graphic representation of the shape factor, the shape factor provides a visual representation of the signal to noise ratio of the flow meter sensor signals; e.g., a first graphic representation (e.g., a defined arc-shape) indicative of a first level of signal-to-noise indicative of a first type of fluid flow (e.g., single phase fluid flow), and a second graphic representation (e.g., a circular-shape) indicative of a second level of signal-to-noise indicative of a first type of fluid flow (e.g., multi-phase fluid flow). The graphic representations of shape factors shown in FIGS. 4A, 5A, 6A, 7A, and 8A are non-limiting examples of shape factor graphic representations. The present disclosure is not limited to these exemplary representations, but rather includes any graphic shape factor that may be associated with a particular type of fluid flow, which graphic shape factors are distinguishable from one another.

Like the graphical representation of the shape factor, the numeric representation of the shape factor provides information relating to the signal to noise ratio of the flow meter sensor signals. The present disclosure is not limited to any particular methodology for determining a numeric shape factor value. For example, the arrival vector component data used to create the graphic representations could also be utilized to create numeric values; e.g., by evaluating the data points in terms of orthogonal contribution, or applying a curve fit algorithm, etc. Also similar to the quality metric, the range of numeric shape factor values may be arbitrarily assigned; e.g., based on the specific manner in which they are determined. The numeric shape factor values depicted in FIGS. 4A, 5A, 6A, 7A, and 8A, for example, are normalized to have a range of values between one and zero (1.0-0.0). The present disclosure is not limited to any particular numeric shape factor value range, normalized or otherwise.

FIGS. 4A, 5A, 6A, 7A, and 8A are Argand plots 66 associated with the exemplary fluid flows 12 characterized in the k-ω plots of FIGS. 4, 5, 6, 7, and 8 respectively. The Argand plot 66 in each of FIGS. 4A, 5A, 6A, 7A, and 8A shows a shape factor graphic representation 68A, 68B, 68C for a first, second, and third channel (with each channel associated with a particular ultrasonic sensor unit), respectively.

The fluid flow 12 represented in the Argand plot of FIG. 4A, for example, is a dry gas fluid flow. The numeric shape factor value associated with graphic representation 68A of the first channel is 0.75. The numeric shape factor value associated with graphic representation 68B of the second channel is 0.74. The numeric shape factor value associated with graphic representation 68C of the third channel is 0.63. The graphic representation of each of these channels has a relatively well defined thin arc shape. The aforesaid graphic representations are predominantly a function of phase modulation (an angular sweep of the fluid component modulation vector), with little contribution of amplitude modulation.

Figure 5:
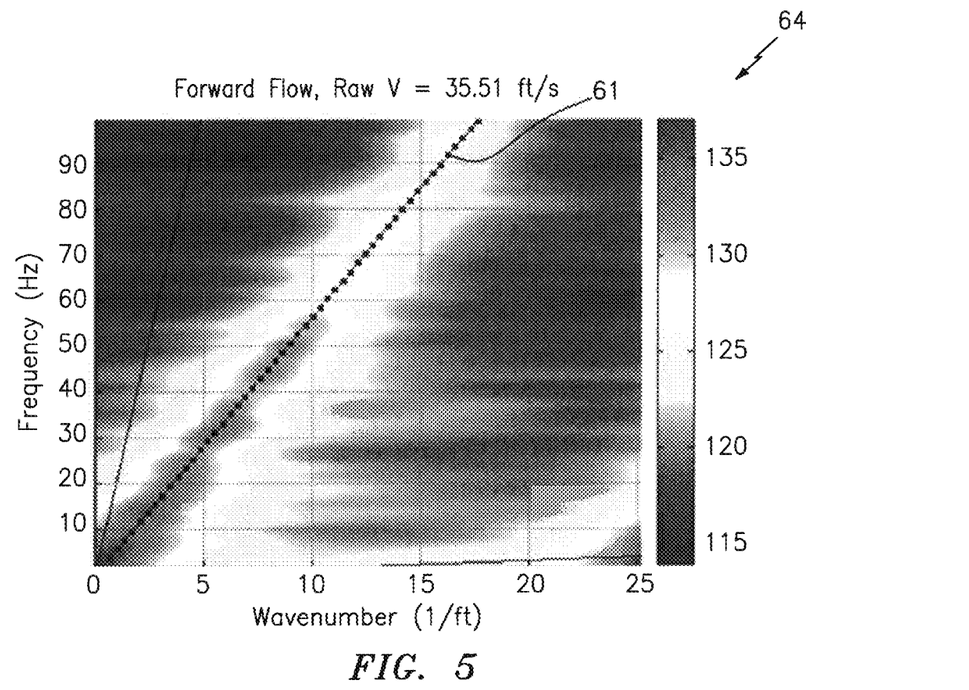
FIG. 5 is a k-ω plot showing a convective ridge associated with a slightly wet gas fluid flow.
Figure 5A:
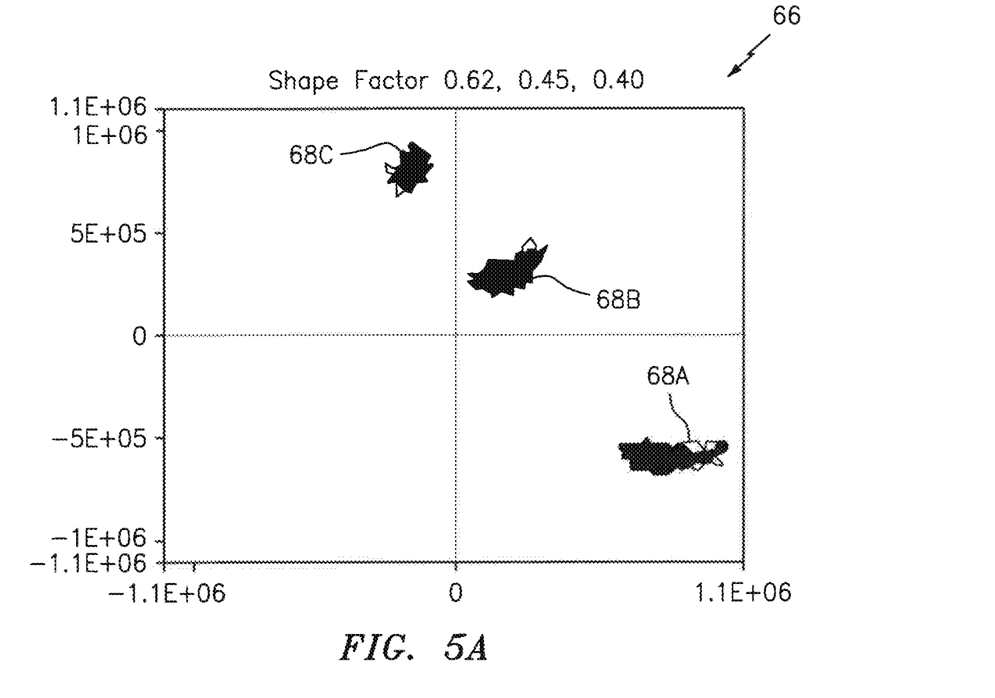
FIG. 5A is an Argand plot associated with a slightly wet fluid flow, showing graphic representations of shape factors.

The fluid flow 12 represented in the Argand plot shown in FIG. 5A, for example, is a multi-phase fluid flow having a relatively small percentage of liquid relative to the gas percentage of the fluid flow (i.e., a "slightly wet gas" fluid flow). The numeric shape factor value associated with graphic representation 68A of the first channel is 0.52. The numeric shape factor value associated with the graphic representation 68B of the second channel is 0.45. The numeric shape factor value associated with the graphic representation 68C of the third channel is 0.40. The graphic representation of each of these channels has an arc shape that is less well defined than the corresponding graphic representations in FIG. 4A, and respective lower numeric shape factor values. The aforesaid shape factors are indicative of less phase modulation contribution (angular sweep of the fluid component modulation vector) and more amplitude modulation contribution than those associated with the flow represented in FIG. 4A.

Figure 6A:
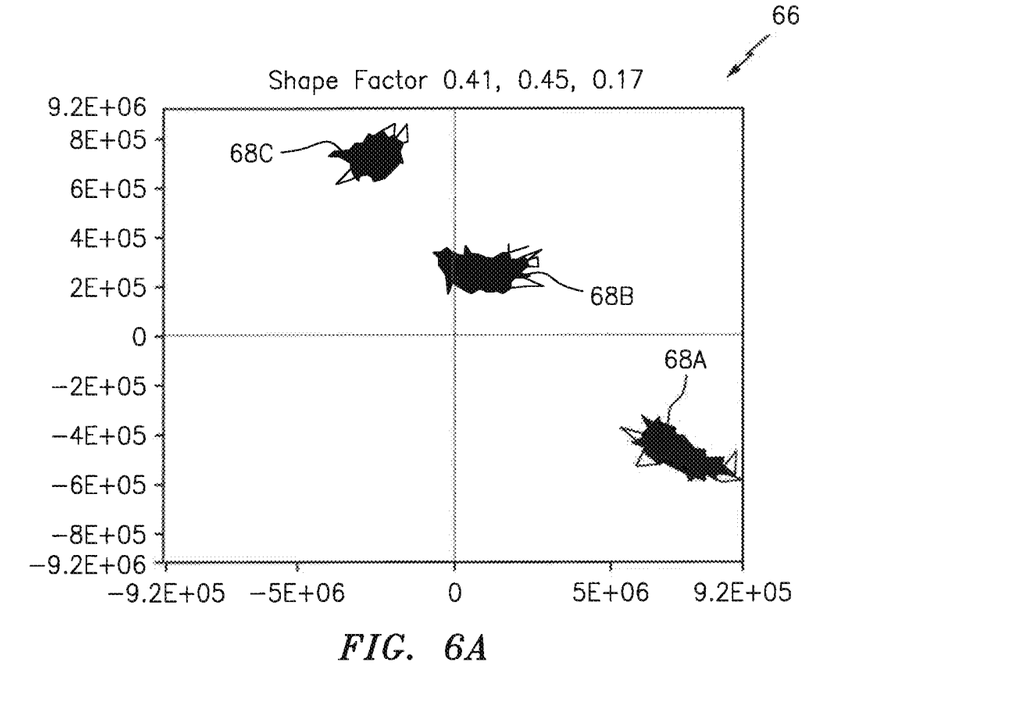
FIG. 6A is an Argand plot associated with a somewhat wet fluid flow, showing graphic representations of shape factors.

The fluid flow 12 represented in the Argand plot 66 shown in FIG. 6A is a multi-phase fluid flow having a relatively greater percentage of liquid relative to the gas percentage of the fluid flow (i.e., a "somewhat wet gas" fluid flow) as compared to the fluid flow 12 characterized in FIG. 5A. The numeric shape factor value associated with graphic representation 68A of the first channel is 0.41. The numeric shape factor value associated with graphic representation 68B of the second channel is 0.49. The numeric shape factor value associated with graphic representation 68C of the third channel is 0.17. The graphic representation of each of these channels has an arc shape that is still less defined than the corresponding graphic representations in FIG. 5A, and respective lower numeric values. The aforesaid shape factors are indicative of less phase modulation contribution and more amplitude modulation contribution than the graphic representations in FIG. 5A.

Figure 7A:
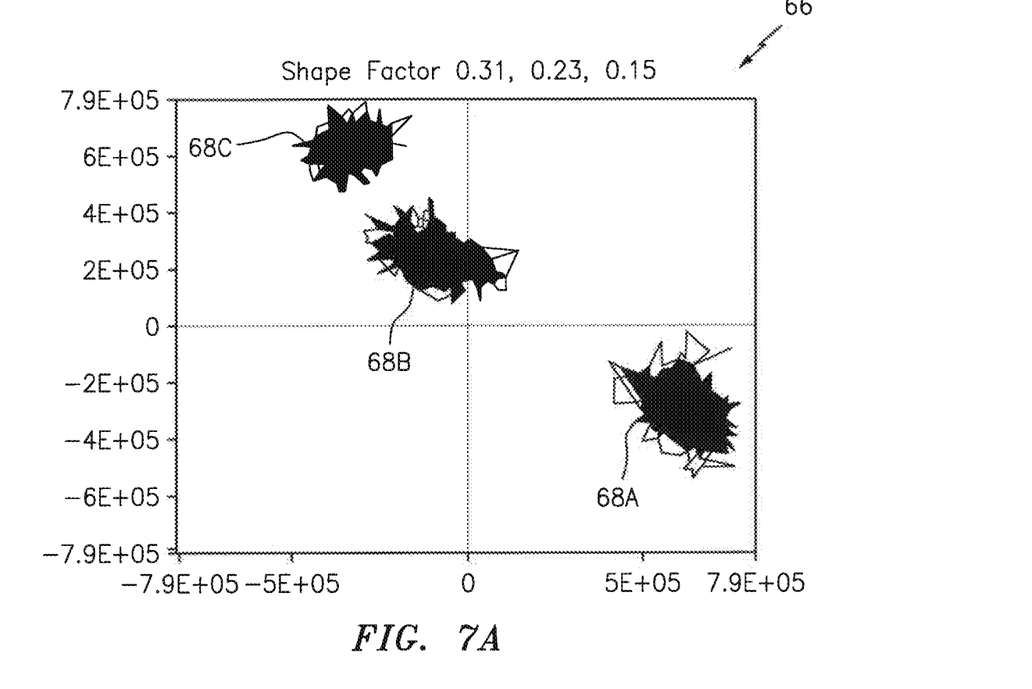
FIG. 7A is an Argand plot associated with a wet fluid flow, showing graphic representations of shape factors.

The fluid flow 12 represented in the Argand plot shown in FIG. 7A is a multiphase fluid flow having a relatively greater percentage of liquid relative to the gas percentage of the fluid flow (i.e., a "wet gas" fluid flow) as compared to the fluid flow 12 characterized in FIG. 6A. The numeric shape factor value associated with graphic representation 68A of the first channel is 0.31. The numeric shape factor value associated with graphic representation 68B of the second channel is 0.33. The numeric shape factor value associated with graphic representation 68C of the third channel is 0.15. The graphic representation of each of these channels has a shape that is more circular-shaped than arc-shaped, and therefore is less defined than the corresponding graphic representations in FIG. 6A (and has lower respective shape factor values). The aforesaid shape factors are indicative of less phase modulation contribution and more amplitude modulation contribution than the graphic representations in FIG. 6A.

Figure 8A:
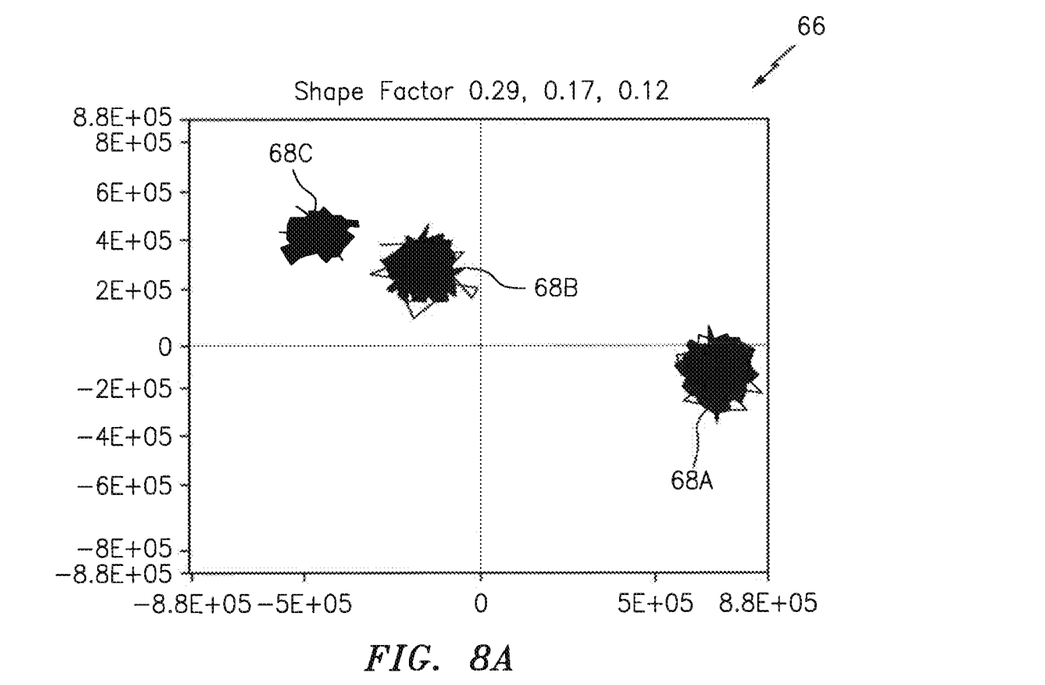
FIG. 8A is an Argand plot associated with a very wet fluid flow, showing graphic representations of shape factors.

The fluid flow 12 represented in the Argand plot shown in FIG. 8A is a multiphase fluid flow having a relatively greater percentage of liquid relative to the gas percentage of the fluid flow (i.e., a "very wet gas" fluid flow) as compared to the fluid flow 12 characterized in FIG. 7A. The numeric shape factor value associated with graphic representation 68A of the first channel is 0.29. The numeric shape factor value associated with graphic representation 68B of the second channel is 0.17. The numeric shape factor value associated with graphic representation 68C of the third channel is 0.12. The graphic representation of each of these channels has a shape that is more circular-shaped than arc-shaped, and therefore is less defined than the corresponding graphic representations in FIG. 7A (and has lower respective shape factor values). The aforesaid shape factors are indicative of less phase modulation contribution and more amplitude modulation contribution than the graphic representations in FIG. 7A.

From the Argand plots 66 in FIGS. 4A, 5A, 6A, 7A, and 8A and the associated shape factor values, a qualitative relationship between the graphic shape factor representations and the associated shape factor values and the wetness of the fluid flow 12 can be seen. Hence, the shape factor graphical representations and/or numeric values can be used as an indicator of the presence (or absence) of and relative ratio of a secondary phase in a fluid flow 12.

In addition to the shape factor value providing qualitative information, in some instances the shape factor value can also be used to provide quantitative information. For example, quantitative information may be determined by correlating the shape factor value to the gas/liquid ratio in a flow 12; e.g., by determining shape factor values for a statistically sufficient population of fluid flows, and determining specific gas/liquid ratio values (i.e., wetness values) for each of the fluid flows 12. An empirical value database, graphic solution, and/or mathematical expression representative of the relationship between the shape factor values and the gas/liquid ratio values can be subsequently used to provide quantitative information for fluid flows 12 other than those used to create the statistically sufficient empirical database, graphical solution, and/or mathematical expression.

The present disclosure describes two different parameters (e.g., the quality metric and the shape factor) that provide information relating to the signal to noise ratio of the flow meter sensor signals, and information relating to the phase of the fluid flow being sensed by the flow meter. On a given system, only one of these two parameters may be utilized, or they may be utilized in concert with one another. As indicated above, the quality metric parameter is determined using sensor signal data processed by a processor of the flow meter for use in a k-$\omega$ plot, whereas the shape factor parameter is determined using sensor signal data that has not been processed for a k-$\omega$ plot. Using the two parameters in concert can provide additional information regarding relative to the phase of the respective flow meter sensors, and the accuracy of the fluid flow phase information.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for sensing a fluid flow passing within a pipe, comprising:
    a flow meter having an array of sensors and at least one processing unit in communication with one another, wherein the at least one processing unit is in communication with a memory device having stored instructions, the stored instructions when executed cause the processing unit to:
        communicate with the array of sensors, including receiving sensor signals from the array of sensors, the sensor signals being indicative of a presence of vortical structures convecting with the fluid flow passing within the pipe; and
        determine a shape factor parameter value for the fluid flow passing within the pipe, the determination of the shape factor parameter including transforming the sensor signals into a complex plane representation that includes an arrival vector having an amplitude and a phase, wherein the shape factor parameter is a function of the amplitude and phase of the arrival vector, the shape factor parameter value within a range between a first range value and a second range value;
    wherein the first range value is associated with a first gas-liquid ratio value, and the second range value is associated with a second gas-liquid ratio value, and the second gas-liquid ratio value is less than the first gas-liquid ratio value;
    wherein the first range value is associated with a dry gas fluid flow and the second range value is associated with a wet gas fluid flow relative to the dry gas fluid flow.

2. The apparatus of claim 1, wherein the stored instructions further cause the processing unit to produce the shape factor parameter as a graphic representation displayed within an Argand plot.

3. The apparatus of claim 1, wherein the stored instructions further cause the processing unit to determine the shape factor parameter without a compositional definition of the fluid flow.

4. The apparatus of claim 1, wherein the stored instructions cause the processing unit to determine the shape factor parameter independent of a k-$\omega$ plot.

5. The apparatus of claim 1, wherein the stored instructions further cause the processing unit to produce the shape factor parameter value as a graphic representation.

6. The apparatus of claim 5, wherein the graphic representation is displayed within an Argand plot.

7. The apparatus of claim 1, wherein the stored instructions further cause the processing unit to determine the shape factor parameter value without a compositional definition of the fluid flow.

8. A method of sensing a fluid flow passing within a pipe, comprising:
    using a flow meter having an array of sensors and at least one processing unit in communication with one another, wherein the at least one processing unit is in communication with a memory device having stored instructions, the stored instructions when executed cause the processing unit to:
        communicate with the array of sensors, including receiving sensor signals from the array of sensors, the sensor signals being indicative of a presence of vortical structures convecting with the fluid flow passing within the pipe; and
        determine a shape factor parameter value for the fluid flow passing within the pipe, the determination of the shape factor parameter including transforming the sensor signals into a complex plane representation that includes an arrival vector having an amplitude and a phase, wherein the shape factor parameter is a function of the amplitude and phase of the arrival vector, the shape factor parameter value within a range between a first range value and a second range value;
    wherein the first range value is associated with a first gas-liquid ratio value, and the second range value is associated with a second gas-liquid ratio value, and the second gas-liquid ratio value is less than the first gas-liquid ratio value.

9. The method of claim 8, wherein the stored instructions further cause the processing unit to produce the shape factor parameter value as a graphic representation.

10. The method of claim 9, wherein the graphic representation is displayed within an Argand plot.

11. The method of claim 8, wherein the stored instructions further cause the processing unit to determine the shape factor parameter value without a compositional definition of the fluid flow.

12. An apparatus for sensing a fluid flow passing within a pipe, comprising: a flow meter having an array of sensors and at least one processing unit in communication with one another, wherein the at least one processing unit is in communication with a memory device having stored instructions, the stored instructions when executed cause the processing unit to: communicate with the array of sensors, including receiving sensor signals from the array of sensors, the sensor signals being indicative of a presence of vortical structures convecting with the fluid flow passing within the pipe; and displaying a graphic shape factor parameter representative of the fluid flow passing within the pipe, the displayed graphic shape factor parameter produced by transforming the sensor signals into a complex plane representation that includes an arrival vector having an amplitude and a phase, wherein the graphic shape factor parameter is a function of the amplitude and phase of the arrival vector, the graphic shape factor parameter displayed within a range between a first graphic shape factor parameter and a second graphic shape factor parameter; wherein the first graphic shape factor parameter is associated with a first gas-liquid ratio value, and the second graphic shape factor parameter is associated with a second gas-liquid ratio value, and the second gas-liquid ratio value is less than the first gas-liquid ratio value.

13. The method of claim 7, wherein the graphic shape factor parameter is displayed within an Argand plot.

14. The method of claim 7, wherein the stored instructions further cause the processing unit to determine the graphic shape factor parameter without a compositional definition of the fluid flow.

* * * * *